(12) United States Patent
Shinya et al.

(10) Patent No.: US 8,773,624 B2
(45) Date of Patent: *Jul. 8, 2014

(54) RESIN COMPOSITION AND IMAGE DISPLAY APPARATUS

(75) Inventors: Yoshihisa Shinya, Tochigi (JP); Yusuke Kamata, Tochigi (JP)

(73) Assignee: Sony Chemical & Information Device Corporation, Tokyo (JP)

(*) Notice: Subject to any disclaimer, the term of this patent is extended or adjusted under 35 U.S.C. 154(b) by 924 days.

This patent is subject to a terminal disclaimer.

(21) Appl. No.: 12/450,108

(22) PCT Filed: Apr. 9, 2008

(86) PCT No.: PCT/JP2008/057005
§ 371 (c)(1),
(2), (4) Date: Sep. 11, 2009

(87) PCT Pub. No.: WO2008/126860
PCT Pub. Date: Oct. 23, 2008

(65) Prior Publication Data
US 2010/0097552 A1 Apr. 22, 2010

(30) Foreign Application Priority Data

Apr. 9, 2007 (JP) ................................ 2007-102251
Jul. 17, 2007 (JP) ................................ 2007-186360
Jan. 11, 2008 (JP) ................................ 2008-005027

(51) Int. Cl.
| | |
|---|---|
| *G02F 1/1333* | (2006.01) |
| *G02F 1/1339* | (2006.01) |
| *C09J 133/06* | (2006.01) |
| *C09J 109/00* | (2006.01) |
| *G02F 1/1335* | (2006.01) |
| *C08L 51/04* | (2006.01) |
| *C08L 45/00* | (2006.01) |
| *C08L 19/00* | (2006.01) |

(52) U.S. Cl.
CPC .............. *C09J 109/00* (2013.01); *G02F 1/1335* (2013.01); *G02F 2202/023* (2013.01); *C09J 133/066* (2013.01); *G02F 2201/50* (2013.01); *C08L 51/04* (2013.01); *G02F 1/1333* (2013.01); *C08L 45/00* (2013.01); *C08L 19/006* (2013.01)
USPC .......................................... 349/122; 349/153

(58) Field of Classification Search
None
See application file for complete search history.

(56) References Cited

U.S. PATENT DOCUMENTS

| | | | |
|---|---|---|---|
| 5,976,297 | A | 11/1999 | Oka et al. |
| 6,204,896 | B1 | 3/2001 | Matsuhira et al. |

(Continued)

FOREIGN PATENT DOCUMENTS

| | | |
|---|---|---|
| CN | 1609943 A | 4/2005 |
| CN | 1661447 A | 8/2005 |

(Continued)

OTHER PUBLICATIONS

Mar. 22, 2010 Search Report issued in European Patent Application No. 08740108.9.

(Continued)

*Primary Examiner* — Wen-Ying P Chen
(74) *Attorney, Agent, or Firm* — Oliff PLC

(57) ABSTRACT

A thin image display apparatus capable of high luminance and high contrast display of a display part, which does not produce display defects resulting from deformation of the image display part. The thin image display apparatus has an image display part and a light-transmitting protective part arranged on the image display part. A cured resin layer is arranged between the image display part and the protective part. The cured resin layer has a transmittance in the visible region of 90% or higher and a storage modulus at 25° C. of $1.0 \times 10^7$ Pa or less. The cured resin layer is formed from a resin composition which has a curing shrinkage ratio of 5.0% or less.

14 Claims, 9 Drawing Sheets

(56) References Cited

U.S. PATENT DOCUMENTS

| | | |
|---|---|---|
| 6,218,446 B1 | 4/2001 | Arnold et al. |
| 6,383,558 B1 | 5/2002 | Fujiwara et al. |
| 6,461,709 B1 | 10/2002 | Janssen et al. |
| 6,654,083 B1 | 11/2003 | Toda et al. |
| 6,673,850 B1 | 1/2004 | Yamato et al. |
| 7,910,033 B2 | 3/2011 | Kamata et al. |
| 7,927,533 B2 | 4/2011 | Kamiya et al. |
| 2001/0039326 A1 | 11/2001 | Misumi et al. |
| 2002/0018163 A1 | 2/2002 | Yamamoto et al. |
| 2002/0118323 A1 | 8/2002 | Itou et al. |
| 2002/0131141 A1 | 9/2002 | Saitoh |
| 2003/0006704 A1 | 1/2003 | Morimoto et al. |
| 2003/0087054 A1 | 5/2003 | Janssen et al. |
| 2005/0126697 A1 | 6/2005 | Kuczynski |
| 2005/0172891 A1 | 8/2005 | Suzuki et al. |
| 2005/0190335 A1 | 9/2005 | Maruyama et al. |
| 2005/0249683 A1 | 11/2005 | L'Alloret |
| 2006/0108050 A1 | 5/2006 | Satake et al. |
| 2006/0128856 A1 | 6/2006 | Takahashi et al. |
| 2006/0159867 A1 | 7/2006 | O'Donnell |
| 2006/0222809 A1 | 10/2006 | Yamada et al. |
| 2006/0235101 A1 | 10/2006 | Messe |
| 2006/0272771 A1 | 12/2006 | Suzuki et al. |
| 2007/0046874 A1* | 3/2007 | Adachi et al. .................. 349/122 |
| 2007/0133225 A1 | 6/2007 | Sakai |
| 2009/0128767 A1 | 5/2009 | Suezaki et al. |
| 2009/0162645 A1 | 6/2009 | Matsuhira |
| 2009/0283211 A1 | 11/2009 | Matsuhira |
| 2009/0296033 A1 | 12/2009 | Shinya et al. |
| 2010/0097552 A1 | 4/2010 | Shinya et al. |
| 2010/0097746 A1 | 4/2010 | Toyoda et al. |

FOREIGN PATENT DOCUMENTS

| | | |
|---|---|---|
| CN | 1788041 A | 6/2006 |
| EP | 0 789 295 A1 | 8/1997 |
| EP | 1 261 011 A2 | 11/2002 |
| EP | 1 283 106 A1 | 2/2003 |
| EP | 1 739 473 A2 | 1/2007 |
| EP | 1 973 089 A1 | 9/2008 |
| EP | 2 051 227 A1 | 4/2009 |
| EP | 2 133 855 A1 | 12/2009 |
| JP | A-60-79388 | 5/1985 |
| JP | A-2-165188 | 6/1990 |
| JP | A-3-204616 | 9/1991 |
| JP | A-6-75701 | 3/1994 |
| JP | A-6-299126 | 10/1994 |
| JP | A-6-337411 | 12/1994 |
| JP | A-7-13173 | 1/1995 |
| JP | A-07-64282 | 3/1995 |
| JP | A-8-122759 | 5/1996 |
| JP | A-8-160407 | 6/1996 |
| JP | A-8-211353 | 8/1996 |
| JP | A-8-220554 | 8/1996 |
| JP | A-8-328023 | 12/1996 |
| JP | A-9-87593 | 3/1997 |
| JP | A-9-274536 | 10/1997 |
| JP | A-9-318932 | 12/1997 |
| JP | A-10-81956 | 3/1998 |
| JP | A-10-83247 | 3/1998 |
| JP | A-10-95967 | 4/1998 |
| JP | A-10-293314 | 11/1998 |
| JP | A-2000-73025 | 3/2000 |
| JP | A-2000-258780 | 9/2000 |
| JP | A-2000-267118 | 9/2000 |
| JP | A-2000-284700 | 10/2000 |
| JP | A-2001-026758 | 1/2001 |
| JP | A-2001-37868 | 2/2001 |
| JP | A-2001-141907 | 5/2001 |
| JP | A-2001-290005 | 10/2001 |
| JP | A-2002-19013 | 1/2002 |
| JP | 2002-052552 A | 2/2002 |
| JP | A-2002-40208 | 2/2002 |
| JP | A-2002-52552 | 2/2002 |
| JP | A-2002-92957 | 3/2002 |
| JP | A-2002-108238 | 4/2002 |
| JP | 2002-258268 A | 9/2002 |
| JP | A-2002-528298 | 9/2002 |
| JP | B2-3327423 | 9/2002 |
| JP | A-2002-323861 | 11/2002 |
| JP | A-2002-341317 | 11/2002 |
| JP | A-2002-341776 | 11/2002 |
| JP | A-2002-348150 | 12/2002 |
| JP | A-2002-543545 | 12/2002 |
| JP | A-2003-3150 | 1/2003 |
| JP | A-2003-29644 | 1/2003 |
| JP | A-2003-150065 | 5/2003 |
| JP | A-2003-207790 | 7/2003 |
| JP | A-2003-295780 | 10/2003 |
| JP | 2004-029711 A | 1/2004 |
| JP | A-2004-9665 | 1/2004 |
| JP | A-2004-061925 | 2/2004 |
| JP | A-2004-77887 | 3/2004 |
| JP | A-2004-115757 | 4/2004 |
| JP | A-2004-117545 | 4/2004 |
| JP | 2004-170907 A | 6/2004 |
| JP | A-2004-169023 | 6/2004 |
| JP | A-2004-212521 | 7/2004 |
| JP | A-2004-224855 | 8/2004 |
| JP | A-2004-256595 | 9/2004 |
| JP | A-2004-271935 | 9/2004 |
| JP | A-2004-279946 | 10/2004 |
| JP | A-2004-359769 | 12/2004 |
| JP | A-2005-23315 | 1/2005 |
| JP | 2005-076017 A | 3/2005 |
| JP | A-2005-55641 | 3/2005 |
| JP | A-2005-154581 | 6/2005 |
| JP | A-2005-179481 | 7/2005 |
| JP | A-2005-225127 | 8/2005 |
| JP | A-2005-234129 | 9/2005 |
| JP | A-2005-283749 | 10/2005 |
| JP | A-2005-314687 | 11/2005 |
| JP | A-2005-315901 | 11/2005 |
| JP | A-2006-11212 | 1/2006 |
| JP | A-2006-53425 | 2/2006 |
| JP | A-2006-053531 | 2/2006 |
| JP | A-2006-58753 | 3/2006 |
| JP | A-2006-106503 | 4/2006 |
| JP | 2006-154758 A | 6/2006 |
| JP | A-2006-150755 | 6/2006 |
| JP | A-2006-159412 | 6/2006 |
| JP | A-2006-189715 | 7/2006 |
| JP | A-2006-193730 | 7/2006 |
| JP | A-2006-221187 | 8/2006 |
| JP | 2006-277828 A | 10/2006 |
| JP | 2006-282911 A | 10/2006 |
| JP | 2006-292993 | 10/2006 |
| JP | A-2006-267502 | 10/2006 |
| JP | A-2006-276105 | 10/2006 |
| JP | A-2006-308866 | 11/2006 |
| JP | A-2006-342222 | 12/2006 |
| JP | A-2007-10769 | 1/2007 |
| JP | A-2007-23147 | 2/2007 |
| JP | A-2007-47621 | 2/2007 |
| JP | A-2007-102252 | 4/2007 |
| JP | A-2007-108592 | 4/2007 |
| JP | A-2007-114737 | 5/2007 |
| JP | A-2007-140220 | 6/2007 |
| JP | A-2007-156066 | 6/2007 |
| JP | 2007-249038 A | 9/2007 |
| JP | A-2007-298667 | 11/2007 |
| JP | A-2008-507617 | 3/2008 |
| JP | A-2009-274536 | 11/2009 |
| KR | 2005-0067162 A | 6/2005 |
| TW | 482913 | 4/2002 |
| TW | 2004 22708 A | 11/2004 |
| TW | A-2007-10155 | 3/2007 |
| WO | WO 01/87595 A1 | 11/2001 |
| WO | WO 2006/129665 A1 | 12/2006 |

(56) References Cited

FOREIGN PATENT DOCUMENTS

| WO | WO 2007/063751 A1 | 6/2007 |
|---|---|---|
| WO | WO 2007/066590 A1 | 6/2007 |
| WO | WO 2008/007800 A1 | 1/2008 |

OTHER PUBLICATIONS

Jul. 9, 2012 Office Action issued in European Patent Application No. 08 740 127.9.
Jun. 18, 2012 Third Office Action issued in Chinese Patent Application No. 200880011250.8 (with translation).
Jul. 31, 2012 Office Action issued in European Patent Application No. 08 740 108.9.
Aug. 15, 2012 Office Action issued in Japanese Patent Application No. 2008-185415 (with translation.).
Submission of Publications and the like issued in Japanese Application No. 2008-098342 on Jul. 6, 2011 (with translation).
Submission of Publications and the like issued in Japanese Application No. 2008-105198 on Jul. 11, 2011 (with translation).
Japanese Submission of Publications and the like filed in Japanese Patent Application No. 2008-98342 on Oct. 3, 2011 (with translation).
Japanese Patent Application No. 2007-102251 filed on Apr. 9, 2007.
Japanese Patent Application No. 2006-193730 filed on Jul. 14, 2006.
Japanese Patent Application No. 2008-005027 filed on Jan. 11, 2008 (with partial translation).
Japanese Patent Application No. 2007-186360 filed on Jul. 17, 2007 (with partial translation).
Japanese Patent Application No. 2007-102252 filed on Apr. 9, 2007.
Supplemental European Search Report dated Jun. 7, 2010 issued in European Patent Application No. 08740127.9.
Japanese Office Action dated Aug. 6, 2008 issued in Japanese Patent Application No. 11-038529.
Japanese Office Action dated Dec. 26, 2008 issued in Japanese Patent Application No. 11-038529.
Japanese Office Action dated May 18, 2009 issued in Japanese Patent Application No. 11-038529.
Japanese Preliminary Report dated Oct. 16, 2009 issued in Japanese Patent Application No. 11-038529.
The Committee of Kagaku Daijiten, eds, "Kagaku Daijiten 2", Jul. 15, 2006, pp. 375, Kyoritsu Shuppan Co., Ltd.
Matsumura, ed., "Daijirin", Nov. 3, 1988, pp. 449, Sanseido Publishing Co., Ltd.
The Committee of Shogakukan Daijisen, eds., "Daijisen", Dec. 1, 1995, pp. 492, Shogakukan Inc.
Submission of Publications and the Like dated Dec. 13, 2011 issued in Japanese Patent Application No. 2008-105198 (with translation).
Submission of Publications and the Like dated Dec. 30, 2011 issued in Japanese Patent Application No. 2008-101101 (with translation).
Screen shot of WIPO Patentscope search of WO 2008/007800 date unknown.
Chinese Office Action dated May 25, 2011 issued in Chinese Patent Application No. 200880011341.1 (with translation).
Submission of Publications and the Like dated Dec. 30, 2011 issued in Japanese Patent Application No. 2008-100891 (with translation).
U.S. Appl. No. 12/450,232, filed under the name of Shinya et al. on Sep. 17, 2009.
Translation of International Preliminary Report on Patentability dated Jan. 21, 2010 issued in International Patent Application No. PCT/JP2008/057024.
Second Chinese Office Action issued in Chinese Application No. 200880011250.8 on Nov. 23, 2011 (with translation).
Office Action issued in Japanese Patent Application No. 2008-096150 dated Mar. 28, 2012 (with translation).
Office Action issued in Japanese Patent Application No. 2012-048220 dated Mar. 28, 2012 (with translation).
International Preliminary Report on Patentability for International Application No. PCT/JP2008/057005. issued Jan. 21, 2010.
Written Opinion dated Sep. 19, 2007 issued in International Patent Application No. PCT/JP2007/064120 (with translation).
Submission of Publications and the Like dated Jan. 13, 2012 issued in Japanese Patent Application No. 2008-98342 (with translation).
Japanese Office Action dated Mar. 21, 2012 issued in Japanese Patent Application No. 2008-185415 (with translation).
*Liquified Polyisoprene Rubber LIR*, 2002, pp. 1-7.
"Submission of Publications and the like" filed in Japanese Patent Application No. 2008-105198 on May 9, 2011 (with translation).
Japanese Office Action issued in Japanese Patent Application No. 2008-105198 on Mar. 23, 2011 (with translation).
Feb. 20, 2012 "Submission of Publications and the like" in Japanese Patent Application No. 2008-100891 (with translation).
Feb. 20, 2012 "Submission of Publications and the like" in Japanese Patent Application No. 2008-101101 (with translation).
Feb. 24, 2012 Office Action issued in Taiwanese Patent Application No. 097112938 (with translation).
Apr. 11, 2012 Office Action issued in Chinese Patent Application No. 200880011341.1 (with translation).
Office Action issued in Japanese Patent Application No. 2008-098342 dated Jun. 20, 2012 (with translation).
Office Action issued in Chinese Application No. 200880011250.8 dated Mar. 22, 2011. (with translation).
Japanese Office Action dated Mar. 7, 2012 issued in Japanese Patent Application No. 2008-105198 (with translation.).
Dec. 6, 2012 Chinese Office Action issued in Chinese Patent Application No. 201110129612.7 (with translation).
Dec. 21, 2012 Chinese Office Action issued in Chinese Patent Application No. 200880011341.1 (with translation).
Nov. 21, 2012 Japanese Office Action issued in Japanese Patent Application No. 2008-100891 (with translation).
Dec. 10, 2012 Submission of Publications and the Like issued in Japanese Patent Application No. 2008-098342 (with English Translation).
Dec. 26, 2012 Notification of Reasons of Refusal issued in Japanese Patent Application No. 2012-105372 (with English Translation).
Dec. 26, 2012 Notification of Reasons of Refusal issued in Japanese Patent Application No. 2008-105198 (with English Translation).
Mar. 8, 2013 Office Action issued in Taiwanese Patent Application No. 97112939 (w/English Translation).
Apr. 2, 2013 Office Action issued in U.S. Appl. No. 12/450,325.
Apr. 9, 2013 Office Action issued in U.S. Appl. No. 12/450,263.
Mar. 22, 2011 Office Action issued in Chinese Patent Application No. 200880011250.8 (with translation).
Translation of Jan. 21, 2010 International Preliminary Report issued in International Patent Application No. PCT/JP2008/057005.
Jul. 1, 2008 International Search Report issued in PCT/JP2008/056996 (with translation).
Mar. 23, 2011 Office Action issued in Chinese Patent Application No. 200880019222.0 (with translation).
Jun. 25, 2010 Extended Search Report issued in European Patent Application No. 08740099.0.
Jan. 12, 2010 International Preliminary Report on Patentability issued in PCT/JP2008/056996.
Jun. 10, 2008 International Search Report issued in PCT/JP2008/056818 (with partial translation).
Mar. 19, 2010 Extended Search Report issued in European Patent Application No. 08739924.2.
Jul. 9, 2012 Office Action issued in European Patent Application No. 08 740 171.7.
Jul. 9, 2012 Office Action issued in European Patent Application No. 11 000 219.3.
Jun. 7, 2010 Extended Search Report issued in European Patent Application No. 08740171.7.
Sep. 16, 2010 Office Action issued in U.S. Appl. No. 12/450,192.
Jun. 10, 2008 International Search Report issued in PCT/JP2008/056601 (with partial translation).
Mar. 17, 2010 Extended Search Report issued in European Patent Application No. 08739711.3.
Jul. 11, 2012 Office Action issued in European Patent Application No. 08 740 099.0.
Jan. 30, 2012 Office Action issued in Chinese Patent Application No. 200880015927.5 (with translation).
Apr. 12, 2012 Office Action issued in Chinese Patent Application No. 200880019222.0 (with translation).

(56) References Cited

OTHER PUBLICATIONS

May 25, 2012 Office Action issued in U.S. Appl. No. 12/450,325.
Apr. 26, 2011 Extended Search Report issued in European Patent Application No. 11 000219.3.
Aug. 16, 2012 Office Action issued in Taiwanese Patent Application No. 97112940 (with translation).
Sep. 6, 2012 Office Action issued in U.S. Appl. No. 12/450,263.
Aug. 23, 2012 Office Action issued in U.S. Appl. No. 12/450,232.
Office Action issued Aug. 16, 2012 in Taiwanese Patent Application No. 097112939 (with translation).
Oct. 22, 2012 Chinese Office Action issued in Chinese Patent Application No. 200880019222.0 (with translation).
Aug. 16, 2012 Taiwanese Office Action issued in Taiwanese Patent Application No. 97112942 (with translation).
Oct. 23, 2012 "Trial Decision" of Japanese Patent Application No. H11-038529 (Dissatisfaction No. 2009-14917).
Oct. 22, 2012 Submission of Publications and the like issued in Japanese Patent Application No. 2008-98342 (with translation).
Oct. 24, 2012 Submission of Publications and the like issued in Japanese Patent Application No. 2008-105198 (with translation).
Oct. 25, 2012 Notification of Reasons for Refusal for Japanese Patent Application No. 10-240922 (with translation).
Mar. 21, 2013 Office Action issued in U.S. Appl. No. 12/450,232.
Feb. 20, 2013 Japanese Office Action issued in Japanese Patent Application No. 2008-098342 (with translation).
May 9, 2013 Office Action issued in Chinese Patent Application No. 200880019222.0 (with translation).
May 9, 2013 Submission of Publications and the like (with English translation) in Japanese Application No. 2008-105198.
Jul. 29, 2013 Office Action issued in U.S. Appl. No. 12/450,325.
Jul. 2, 2013 Office Action issued in Japanese Patent Application No. 2008-100891 (with translation).
Jul. 16, 2013 Office Action issued in Japanese Patent Application No. 2012-105372 (with translation).
Apr. 10, 2013 Japanese Office Action issued in Application No. 2008-101101 (w/English Translation).
Mar. 21, 2013 Chinese Office Action issued in Application No. 2200880011250.8 (w/English Translation).
May 7, 2013 Japanese Office Action issued in Patent Application No. 2008-100879 (w/English Translation).
May 7, 2013 Japanese Office Action issued in Patent Application No. 2008-101983 (w/English Translation).
Mar. 21, 2013 Chinese Office Action issued in Patent Application No. 200880011250.8.
Sep. 11, 2013 Office Action issued in U.S. Appl. No. 12/450,232.
Aug. 30, 2013 Submission of Publications and the like (with English translation) in Japanese Application No. 2008-101101.
U.S. Office Action issued in U.S. Appl. No. 12/450,263 mailed Nov. 8, 2013.
Office Action issued in Chinese Application No. 201110129612.7 mailed Oct. 21, 2013 (with English Translation).
Korean Office Action for Application No. 2009-7021093 mailed Dec. 16, 2013 (with English Translation).
Japanese Office Action for Application No. 2008-101101 mailed Nov. 12, 2013 (with English Translation).
Japanese Office Action issued in Application No. 2012-181768 mailed Jan. 14, 2014 (with English Translation).
Japanese Office Action issued in Application No. 2013-089503 mailed Feb. 12, 2014 (with English Translation).
Korean Office Action for Application No. 2009-7021086 mailed Feb. 14, 2014.
Korean Office Action for Application No. 2013-7026158 mailed Jan. 2, 2014.
Chinese Office Action for Application No. 200880011250.8 mailed Feb. 8, 2014.
Apr. 8, 2014 'Submission of Publications and the like' issued in Japanese Patent Application No. 2013-215621 (with English Translation).
Mar. 21, 2014 Office Action issued in U.S. Appl. No. 12/450,232.
Mar. 28, 2014 Decision of Refusal issued in Japanese Patent Application No. 2008-101101 (with English Translation).

\* cited by examiner

1B (a)

(b)

(c)

(a)

(b)

(c)

(a)

(b)

(c)

(a)

(b)

(c)

(a)

(b)

(c)

RELATED ART

RESIN COMPOSITION AND IMAGE DISPLAY APPARATUS

TECHNICAL FIELD

The present invention relates to an image display apparatus, such as a liquid crystal display apparatus (LCD), used in a cellular phone, for example. In particular, the present invention relates to an image display apparatus provided with a transparent protective part on an image display part, in which a cured resin is arranged between the image display part and the protective part.

BACKGROUND ART

Conventionally, as this type of display apparatus, a liquid crystal display apparatus 101 illustrated in FIG. 10, for example, is known. This liquid crystal display apparatus 101 is provided with a transparent protective part 103 made of, for example, glass or plastic on a liquid crystal display panel 102.

To protect the surface of the liquid crystal display panel 102 and a polarizing plate (not illustrated), a spacer 104 is arranged between the liquid crystal display panel 102 and the protective part 103 to form a gap 105 between the liquid crystal display panel 102 and the protective part 103.

However, the gap 105 between the liquid crystal display panel 102 and the protective part 103 scatters light, resulting in decreased contrast and luminance. The presence of the gap 105 also makes it difficult to produce thinner display apparatuses.

To address these problems, it has been proposed to fill the gap between the liquid crystal display panel and the protective part with a resin (see, for example, Patent Document 1). However, the stress generated during the curing shrinkage of the cured resin causes an optical glass plate sandwiching the liquid crystals in the display panel to deform, resulting in image defects such as disrupted orientation of the liquid crystal material.

Furthermore, in the liquid crystal display apparatus 101, to improve the luminance and contrast of a display image, a so-called "black matrix", which is a black box-shaped shielding part (not-illustrated) is formed on the protective part 103 of the periphery of the liquid crystal display panel 102.

However, in such a configuration, if a photocurable resin composition is filled in the gap 105 between the liquid crystal display panel 102 and the protective part 103 and then photocured, the photocurable resin composition in the region where a shielding part is formed may remain uncured due to insufficient light reaching the photocurable resin composition.

[Patent Document 1] Japanese Patent Application Laid-Open No. 2005-55641

DISCLOSURE OF THE INVENTION

Problems to be Solved by the Invention

The present invention was conceived of considering such problems in the conventional art. It is an object of the present invention to provide a thin display apparatus capable of high luminance and high contrast display of a display part, which does not produce display defects resulting from deformation of the image display part. Furthermore, it is another object of the present invention to provide a technique for thoroughly curing the resin of a region where a shielding part is formed.

Means for Solving the Problems

As a result of continued dedicated efforts to achieve the above-described objects, the present inventors completed the resin composition of the present invention by considering the fact that the internal stress which builds up during curing of a resin can be approximated by the product of the after-curing storage modulus and curing shrinkage ratio. As a result, the present inventors discovered a resin composition that has a low curing shrinkage ratio and an after-curing storage modulus in a preferred range as a resin composition to be filled in a gap between a display part and a protective part. Furthermore, the present inventors completed the method for producing an image display apparatus of the present invention by discovering that, for a region where a shielding part is formed, using a curable resin composition which contains at least a thermal polymerization initiator is effective.

The present invention, which was created based on such knowledge, provides an image display apparatus having an image display part and a light-transmitting protective part on the image display part, wherein a cured resin layer is arranged between the image display part and the protective part, and the cured resin layer has a transmittance in the visible region of 90% or higher and a storage modulus at 25° C. of $1.0 \times 10^7$ Pa or less.

Furthermore, the present invention provides this cured resin layer. More specifically, the present invention provides a cured resin layer which is arranged between an image display part of an image display apparatus and a light-transmitting protective part, wherein the cured resin layer has a transmittance in the visible region of 90% or higher and a storage modulus at 25° C. of $1.0 \times 10^7$ Pa or less.

Still further, the present invention provides a resin composition for forming the above-described cured resin layer, wherein the resin composition has a curing shrinkage ratio of 5.0% or less, and a 100 μm-thick cured resin formed by curing the resin composition has a transmittance in the visible region of 90% or higher and a storage modulus at 25° C. of $1.0 \times 10^7$ Pa or less.

In the present invention, the image display part may be a liquid crystal display panel.

In the present invention, the protective part may be formed from an acrylic resin.

In the present invention, the protective part may be formed from an optical glass.

EFFECTS OF THE INVENTION

According to the resin composition of the present invention, the stress generated by resin curing shrinkage when the resin composition is applied between the image display part and the protective part and cured, can be suppressed to a minimum. This allows the effects of such stress on the image display part and the protective part also to be suppressed to a minimum. Therefore, according to the image display apparatus of the present invention, hardly any distortion is produced in the image display part and the protective part.

Furthermore, the cured resin of the resin composition according to the present invention has a refractive index closer to that of a structural panel of the image display part or that of the structural panel of the protective part than the refractive index of the gap which is provided between the liquid crystal display panel and the protective part. Thus, the reflection of light at the interface between the protective part and the resin composition or the interface between the resin composition and the image display part can be suppressed.

Consequently, according to the image display apparatus of the present invention, a high-luminance and high-contrast display which is free from image defects can be provided.

Especially, when the image display part is a liquid crystal display panel, a high-quality display can be achieved by reliably preventing image defects such as disrupted orientation of the liquid crystal material.

In addition, according to the image display apparatus of the present invention, since a cured resin is arranged between the image display part and the protective part, the image display apparatus is stronger against shocks.

Still further, according to the present invention, an image display apparatus which is thinner than the conventional example, in which a gap is provided between the image display part and the protective part, can be provided.

Figure 1:
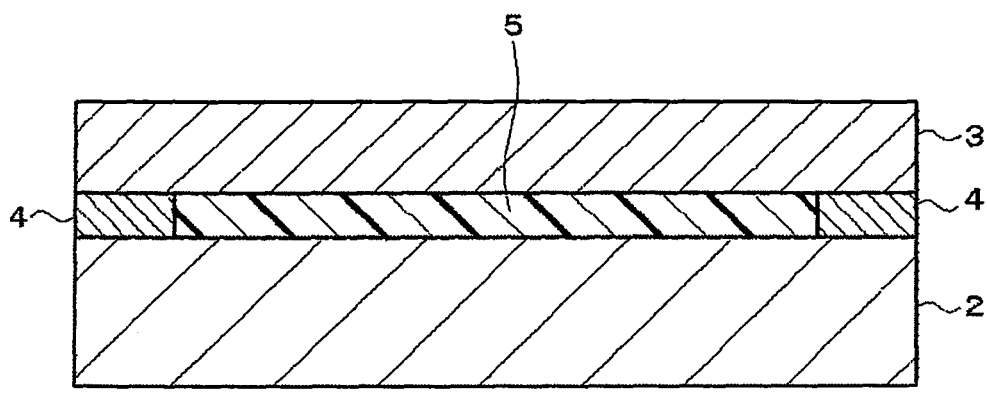
FIG. 1 is a cross-sectional diagram illustrating the main parts of an embodiment of the display apparatus according to the present invention.

DESCRIPTION OF THE REFERENCE NUMERALS 1, 1B, 1C, 1D, 1E, 1F Image display apparatus
2 Display part
3 Protective part
4 Spacer
5 Cured resin or cured resin layer
6, 7 Polarizing plate
12 Base
13 Protective part
14 Light-transmitting member
15 Shielding part
15a Bonding face of the shielding part
16 Frame
16a Bonding face of the frame
17 Backlight
18 Liquid crystal display panel (image display part)
19 Spacer
20 Photocurable resin composition
20a Photocurable resin composition in image display region
21 Photocurable and thermosetting curable resin composition
21a Curable resin composition in a region where a shielding part is formed
21b Curable resin composition in image display region (region not forming the shielding part)
24 Cured resin layer
25 Cured resin layer
30 Irradiation part
31 UV irradiation apparatus
32, 33, 34 UV rays

BEST MODE FOR CARRYING OUT THE INVENTION

A preferred embodiment of the present invention will now be described with reference to the drawings. In the drawings, same-numbered reference numerals represent the same or a similar structural element.

Figure 2:
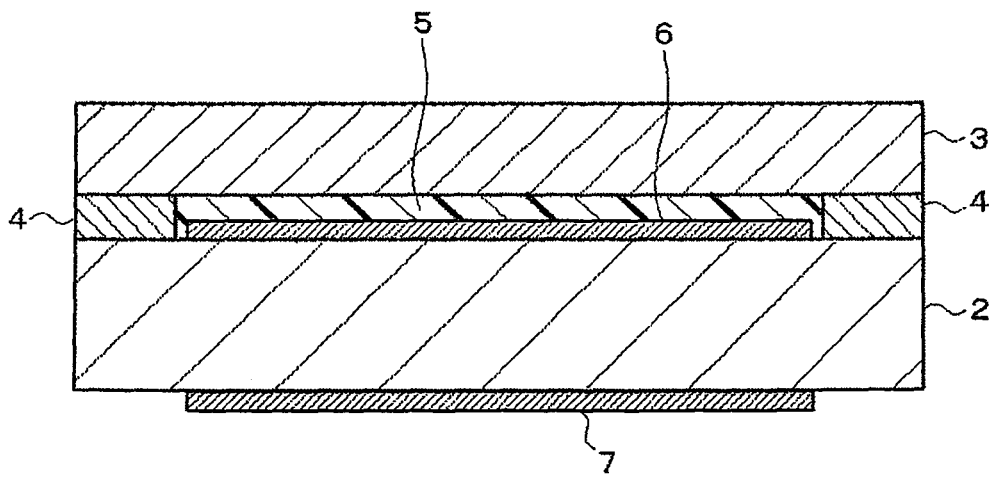
FIG. 2 is a cross-sectional diagram illustrating the main parts of an embodiment of the display apparatus according to the present invention.

FIGS. 1 and 2 are cross-sectional diagrams illustrating the main parts of an embodiment of an image display apparatus according to the present invention.

As illustrated in FIG. 1, a display apparatus 1 of the present embodiment has a display part 2 that is connected to a not-illustrated drive circuit and displays a given image, and a light-transmitting protective part 3 that is arranged facing and in close proximity to the display part 2 at a given distance.

The display part 2 on the display apparatus 1 of the present embodiment is a liquid crystal display panel of a liquid crystal display apparatus. As the surface material of the display part 2, optical glass and plastic (acrylic resin etc.) may be preferably used.

Applications of the liquid crystal display apparatus are not especially limited. The liquid crystal display apparatus may be applied in various products, such as in an electronic device like a cellular phone, a portable game device and the like.

When the display part 2 is a liquid crystal display panel, as illustrated in FIG. 2, polarizing plates 6 and 7 are provided on the surfaces of the display part 2.

The protective part 3 is formed from a light-transmitting member, which is about the same size as the display part 2 and is plate-like, a sheet-like, or film-like. As the light-transmitting member, it is preferred to use, for example, optical glass or plastic (an acrylic resin such as polymethyl methacrylate etc.). An optical layer, such as an anti-reflection film, a shielding film, a viewing angle control film and the like, may also be formed on the top face or rear surface of the protective part 3.

The protective part 3 is provided on the display part 2 via a spacer 4 which is provided on the periphery of the display part 2. The thickness of this spacer 4 is about 0.05 to 1.5 mm. Such a thickness serves to keep the distance between the surfaces of the display part 2 and the protective part 3 at approximately 1 mm.

The display apparatus 1 includes a cured resin layer 5 between the display part 2 and the protective part 3.

In the present invention, the cured resin layer 5 has a transmittance in the visible region of 90% or higher and a storage modulus at 25° C. of $1.0 \times 10^7$ Pa or less, and preferably from $1.0 \times 10^3$ to $1.0 \times 10^6$ Pa. The resin composition forming this cured resin layer 5 has a curing shrinkage ratio of 5.0% or less, preferably 4.5% or less, especially preferably 4.0% or less, and more preferably 0 to 2%.

Figure 3:
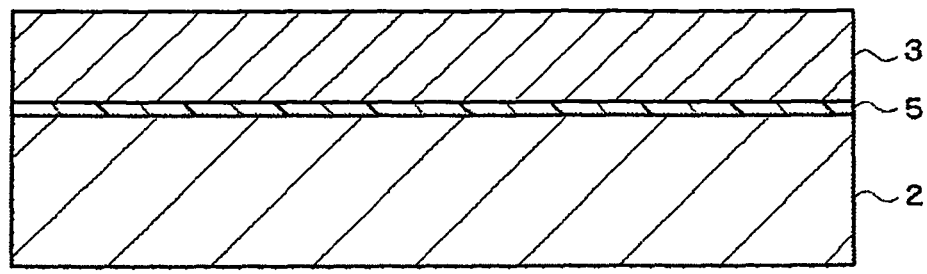
FIG. 3 is a cross-sectional diagram illustrating the main parts of an embodiment of the display apparatus according to the present invention.

The image display apparatus of the present invention is preferably formed without providing the spacer 4 as in the display apparatus 1 of the embodiments illustrated in FIGS. 1 and 2, but rather like the image display apparatus 1B illustrated in FIG. 3. The image display apparatus is formed by sequentially laminating the resin composition layer 5 and the protective part 3 on the display part 2, and then curing the resin composition so as to omit the use of spacers. In this case, the distance between the display part 2 and the protective part 3 (i.e., the thickness of the cured resin layer 5), which is determined by factors such as the viscosity and density of the resin composition and the weight of the protective part 3, is typically in the range of 50 to 200 μm. Such a configuration enables a thinner image display apparatus to be produced.

In the present invention, although the raw material of the cured resin layer 5 is not especially limited, from the standpoint of improving productivity, it is preferred to use a photocurable resin composition.

Examples of such a resin composition which may be preferably used include resin compositions containing at least one kind of polymer, such as a polyurethane acrylate, a polyisoprene acrylate or an ester thereof, a hydrogenated terpene resin, and a butadiene polymer; at least one kind of acrylate monomer, such as isobornyl acrylate, dicyclopentenyl oxyethyl methacrylate and 2-hydroxybutyl methacrylate; and a photopolymerization initiator, such as 1-hydroxycyclohexyl-phenyl-ketone.

The protective part 3 is often provided with a UV-region cutting function to protect the display part 2 against UV rays. Therefore, the photopolymerization initiator is preferably combined with a photopolymerization initiator that can cure even in the visible region (for example, trade name: Speed-Cure TPO, manufactured by Nihon SiberHegner KK).

This resin composition is prepared so that the cured resin obtained by curing the resin composition with UV irradiation has a storage modulus (25° C.) of $1 \times 10^7$ Pa or less, and preferably of $1 \times 10^3$ Pa to $1 \times 10^6$ Pa, a refractive index of preferably of 1.45 or more to 1.55 or less, and more preferably of 1.51 or more to 1.52 or less, and a transmittance of 90% or higher in the visible region when formed into a 100 μm-thick layer. Even when the main resin component forming the resin composition is the same, if an additionally-added resin component or monomer component is different, the cured resin formed by curing such curable resin composition may have a storage modulus (25° C.) that exceeds $1 \times 10^7$ Pa. A resin composition that forms such a cured resin is not included as definition of the resin composition of the present invention.

This resin composition is prepared so as to have a curing shrinkage ratio of preferably 5.0% or less, more preferably 4.5% or less, especially preferably 4.0% or less, and still more preferably 0 to 2%. Consequently, the internal stress that builds up in the cured resin during curing of the resin composition can be reduced, and the distortion at the interface between the cured resin layer 5 and the display part 2 or the protective part 3 can be prevented.

Thus, by arranging the resin composition between the display part 2 and the protective part 3 and then curing the resin composition, the amount of light scattered at the interface between the cured resin layer 5 and the display part 2 or the protective part 3 can be reduced. As a result, the luminance and the visibility of the display image can be improved.

The magnitude of the internal stress that builds up in the cured resin during curing of this resin composition can be evaluated by dropping the resin composition onto a flat plate, curing the dropped resin composition, and measuring the average surface roughness of the resultant cured resin. In practice, the distortion generated at the interface between the display part 2 or the protective part 3 and the resin composition arranged in between can be ignored if, for example, a cured resin obtained by dropping 2 mg of the resin composition onto a glass plate or an acrylic plate and curing by UV irradiation to a 90% or higher cure ratio has an average surface roughness of 6.0 nm or less. However, with the resin composition of the present invention, this average surface roughness can be kept at 6.0 nm or less, preferably at 5.0 or less, and more preferably in the range of 1 to 3 nm. Preferred examples of the glass plate which may be used include the glass plate which sandwiches the liquid crystals of a liquid crystal cell, or the glass plate used as the protective plate for a liquid crystal cell. Furthermore, preferred examples of an acrylic plate which may be used include the acrylic plate used as the protective plate for a liquid crystal cell. These glass plates or acrylic plates usually have an average surface roughness of 1.0 nm or less.

To produce the display apparatus 1 of the present invention, the spacer 4 and a not-illustrated ridge are provided on the display part 2 on its periphery. A given amount of the above-described photocurable resin composition is then dropped onto a region on the inner side of the spacer 4 and the ridge.

The protective part 3 is then placed on the spacer 4 of the display part 2, and the gap between the display part 2 and the protective part 3 is completely filled with the resin composition.

Subsequently, the resin composition is irradiated with UV rays via the protective part 3 to cure the resin composition, whereby the desired display apparatus 1 is obtained.

When producing the display apparatus 1B without the spacer 4 as illustrated in FIG. 3, the above-described photocurable resin composition may be coated onto the display part 2, the protective part 3 then placed over the coated resin composition, and UV rays irradiated from the protective part 3 side.

According to the thus-obtained image display apparatuses 1 and 1B of the present invention, the effects of the stress generated during the resin curing shrinkage on the display part 2 and the protective part 3 can be suppressed to a minimum. Therefore, hardly any distortion is produced in the display part 2 and the protective part 3. Consequently, since the display part 2 is not deformed during production, a high-luminance and high-contrast display which is free from image defects can be provided.

In addition, according to the present embodiment, since the cured resin 5 is filled between the display part 2 and the protective part 3, a thinner display apparatus 1 can be provided which is strong against shocks.

Especially, when the display part 2 is a liquid crystal display panel, a liquid crystal display apparatus can be provided which achieves a high-quality display by reliably preventing image defects such as disrupted orientation of the liquid crystal material.

FIGS. 4(a) to 4(c) are cross-sectional process diagrams illustrating the main parts of a preferred embodiment of the method for producing an image display apparatus 11 which has a protective part having a shielding part using the resin composition according to the present invention. FIG. 5 is a plan diagram illustrating the main parts of the steps for producing an image display apparatus according to the same embodiment.

Figure 4:
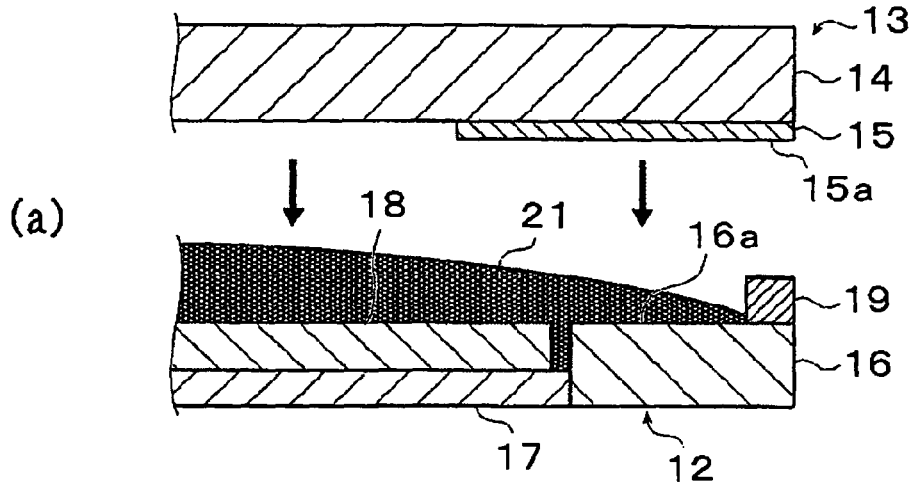
FIG. 4 shows cross-sectional process diagrams illustrating the main parts of an embodiment of the method according to the present invention.
Figure 4:
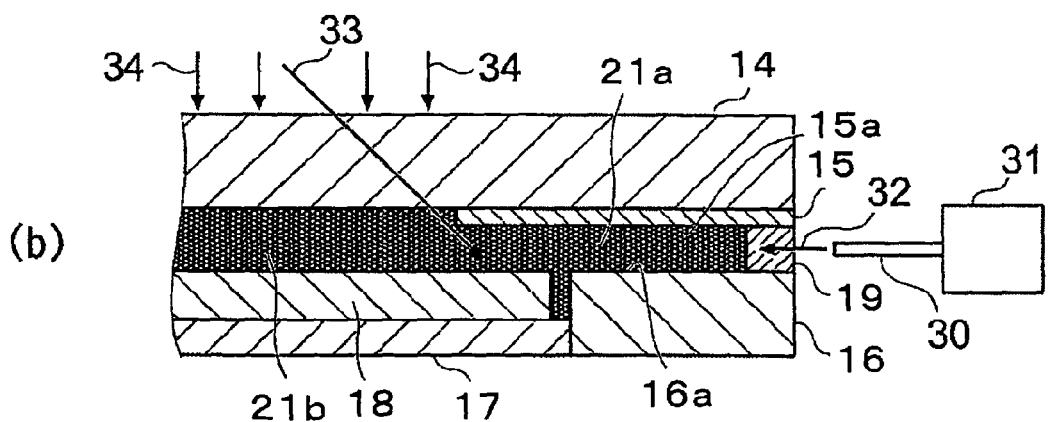
Figure 4:
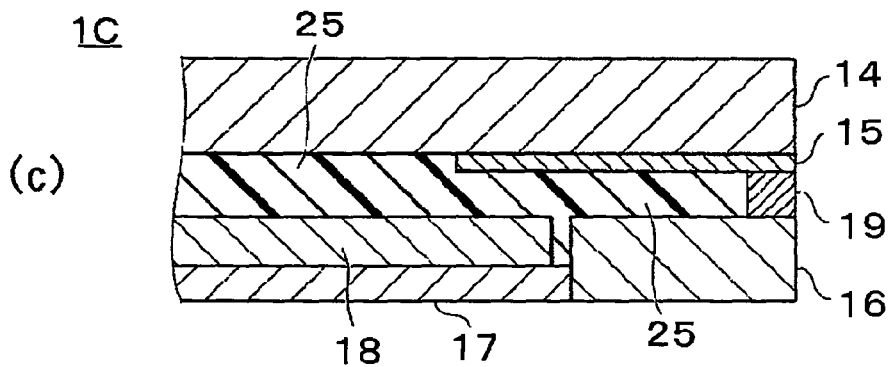
Figure 5:
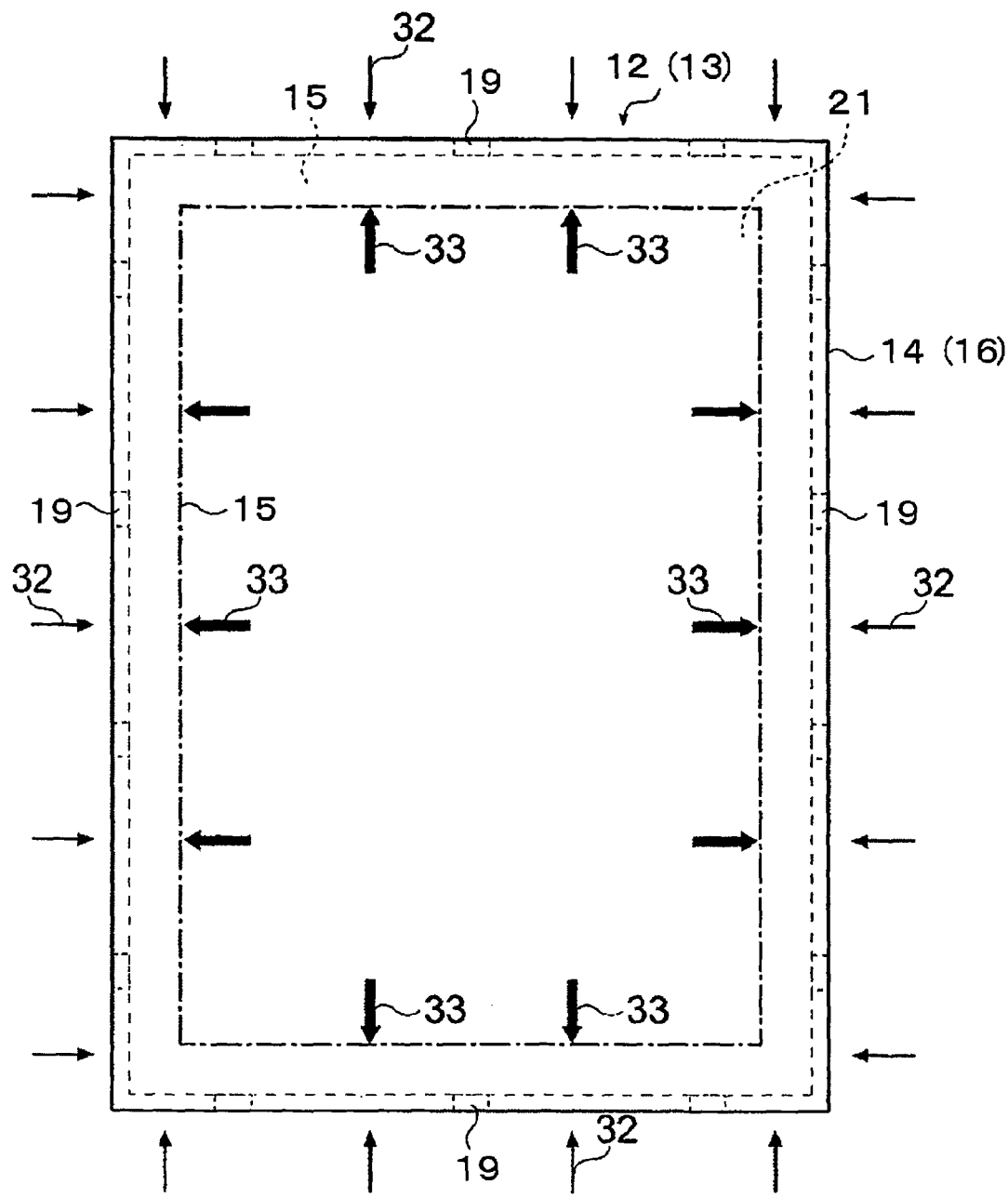
FIG. 5 is a plan diagram illustrating the main parts of the steps for producing an image display apparatus according to the same embodiment.

As illustrated in FIG. 4, in the present embodiment, a base 12, having an image display part which is connected to a not-illustrated drive circuit and displays a given image, and a protective part 13 are bonded together by a cured resin layer 25.

Applications of the image display apparatus are not especially limited. The image display apparatus may be applied in various products, for example, in an image display apparatus such as a cellular phone, a portable game device and the like. The present invention will be described below using as an example the case of producing a liquid crystal display apparatus.

The protective part 13 is formed from a rectangular, flat, light-transmitting member 14, for example, which is about the same size as the base 12. As the light-transmitting member 14, it is preferred to use, for example, plate-like, sheet-like, or film-like optical glass or plastic (acrylic resin etc.).

A black box-shaped shielding part 15, for example, is provided on a region corresponding to the periphery of a liquid crystal display panel 18 on the face on the base 12 side of the light-transmitting member 14. This shielding part 15 is formed in a layer form with a uniform thickness by a printing method, for example.

On the other hand, the base 12 has a box-shaped frame 16, for example. The liquid crystal display panel (image display part) 18 is mounted on a region on the inner side of this frame 16. Furthermore, a backlight 17 is mounted on a position on the apparatus back side of this liquid crystal display panel 18.

As illustrated in FIG. 5, a plurality of spacers 19 is intermittently provided at a given interval along the periphery on the image display face side of the frame 16. The thickness of these spacers 19 is about 0.05 to 1.5 mm. Such a thickness serves to keep the distance between the surfaces of the liquid crystal display panel 18 and the protective part 13 at approximately 1 mm.

In the present embodiment, especially a bonding face 16a of the frame 16 of the base 12 and a bonding face 15a of the shielding part 15 of the protective part 13 are parallel with each other.

In the bonding of such a protective part 13 and base 12, in the present embodiment, first, a given amount of a photocurable and thermosetting curable resin composition 21 is dropped onto a region on the inner side of the spacers 19 on the base 12, as illustrated in FIG. 4(a).

This dropping amount is preferably set so that the thickness of the cured resin layer 25 after bonding the protective part 13 and the base 12 together is 50 to 200 μm.

As the curable resin composition 21, a curable resin composition is used which is the above-described resin composition of the present invention, includes a photopolymerization initiator and a thermal polymerization initiator, and may optionally include within the scope of the object of the present invention another additive, such as a sensitizing agent, a plasticizer, transparent particles and the like.

Here, examples of the photopolymerization initiator which may be used include, but are not limited to, 1-hydroxy-cyclohexyl-phenyl-ketone (trade name: Irgacure 184, manufactured by Ciba Specialty Chemicals Inc.), 2-hydroxy-1-{4-[(4-(2-hydroxy-2-methyl-propionyl)benzyl]phenyl}-2-methyl-propan-1-one (trade name: Irgacure 127, manufactured by Ciba Specialty Chemicals Inc.), 1-hydroxy-cyclohexyl-phenyl-ketone (trade name: Darocur 1173, manufactured by Ciba Specialty Chemicals Inc.) and the like.

The protective part 13 can have a UV-region cutting function to protect the display part against UV rays. In such a case, as the photopolymerization initiator to be used in the present invention, it is preferred to use a photopolymerization initiator that can cure even in the visible region (for example, trade name: SpeedCure TPO, manufactured by Nihon SiberHegner KK).

As the thermal polymerization initiator, it is preferred to use organic peroxides and the like which act as an initiator due to heat. When using a liquid crystal display panel 18 as the image display part like in the present embodiment, a plastic material such as acrylic resin is often used as the panel material. Since the heat resistance of such a plastic material is about 80° C., it is preferred to use an organic peroxide having a ten hour half-life temperature of 100° C. or less as the thermal polymerization initiator.

Here, the "half-life" of the organic peroxide refers to the time taken for the concentration of the organic peroxide to decrease to half of its initial value. The temperature at which this half-life is ten hours is called the "ten hour half-life temperature".

Examples of thermal polymerization initiators having a ten hour half-life temperature of 100° C. or less include Perbutyl O (trade name) manufactured by NOF Corporation ($C_{12}H_{24}O_3$), Peroyl TCP (trade name) manufactured by NOF Corporation ($C_{12}H_{24}O_3$) and the like. The names "Perbutyl" and "Peroyl" are both registered trademarks.

From the standpoint of securing the correct reaction temperature and reaction time, the added amount of the thermal polymerization initiator is preferably 1 to 10 wt % based on the acrylic resin in the above-described curable resin composition 21.

Next, as illustrated in FIG. 4(a), the protective part 13 is placed on the spacer 19 of the base 12, the rear surface of the protective part 13 is brought into contact with the curable resin composition 21, and the curable resin composition 21 is arranged in the gap between the base 12 and the protective part 13.

As illustrated in FIG. 4(b), UV-rays 34 are then irradiated via the light-transmitting member 14 on a curable resin composition 21b, which is in an image display region corresponding to a region where the shielding part 15 is not formed.

The irradiation direction of the UV-rays 34 is not especially limited. However, from the standpoint of achieving more uniform curing of the curable resin composition 21b on the image display region, the direction orthogonal to the surface of the light-transmitting member 14 is preferred.

As illustrated in FIG. 4(b) and in FIG. 5, UV-rays 32 may also be simultaneously directly irradiated from the outward side face of the bonding face 15a of the shielding part 15 (i.e., face forming the shielding part) on a curable resin composition 21a between the shielding part 15 and the base 12 (i.e., curable resin composition in a region where the shielding part 15 is formed) through a gap between the frame 16 and the shielding part 15 among the spacers 19, using a UV irradiation apparatus 31 having a fine irradiation part 30 formed from an optical fiber, for example.

The irradiation direction of the UV-rays 32 is not especially limited, and may be from 0° or more to less than 90° with respect to the horizontal direction. However, from the standpoint of achieving more uniform curing of the curable resin composition 21a in the region where the shielding part 15 is formed, it is preferred to irradiate the UV-rays 32 roughly parallel to the bonding face 16a of the frame 16 of the base 12 and the bonding face 15a of the shielding part 15 of the protective part 13.

Furthermore, as illustrated in FIG. 4(b) and in FIG. 5, together with the irradiation of the UV-rays 34, UV-rays 33 may also be irradiated through the light-transmitting member 14 from the inward side face of the bonding face 15a of the shielding part 15 on the curable resin composition 21a between the shielding part 15 and the base 12, using a not-illustrated UV irradiation apparatus.

In such a case, considering the irradiation efficiency of the UV-rays 33 on the curable resin composition 21a between the shielding part 15 and the base 12, the irradiation direction of the UV-rays 33 is preferably set at a 10 to 45° angle from obliquely upward with respect to the bonding face 16a of the frame 16 of the base 12 or the bonding face 15a of the shielding part 15 of the protective part 13.

If the below-described heating of the curable resin composition 21a in the region where the shielding part 15 is formed is sufficient, the irradiation of the UV-rays 32 and 33 may be omitted.

In the present embodiment, the curable resin composition 21a in the region where the shielding part 15 is formed is heated simultaneously with, or before or after, the irradiation of the UV-rays 34 on the curable resin composition 21b in the image display region.

This heating temperature is not especially limited, but from the standpoint of preventing deformation of the plastic material portion, a temperature of 60 to 100° C. is preferred. The heating may be performed by mounting the image display apparatus on a heating stage after or during the UV irradiation, and heating the whole of the curable resin compositions 21a and 21b. Alternatively, a heater may be arranged at the region where the shielding part 15 is formed along the periphery of the liquid crystal display panel 18.

By thus irradiating with UV-rays 32, 33, and 34, and heating, as illustrated in FIG. 4(c), both the curable resin composition 21b of the image display region and the curable resin composition 21a of the region where a shielding part is formed can be cured to form the cured resin layer 25 and obtain the intended image display apparatus 1C.

According to the present embodiment, in the step for bonding the protective part 13 and the base 12, a curable resin composition 21 which includes both a photopolymerization initiator and a thermal polymerization initiator is used. UV-rays 34 are irradiated through the light-transmitting member 14 on the curable resin composition 21b of the image display region and heating is carried out on the curable resin composition 21a in the region where the shielding part 15 is formed. Furthermore, UV-rays 32 and 33 are optionally irradiated from the inward side face and the outward side face of the bonding face 15a of the shielding part 15. Consequently, not only the curable resin composition 21b of the image display region, but also the curable resin composition 21a in the region where the shielding part 15 is formed can be thoroughly cured.

In addition, by using the specific curable resin composition 21 as described above, the effects of the stress generated during resin curing shrinkage on the liquid crystal display panel 18 and the protective part 13 can be suppressed to a minimum. Therefore, hardly any distortion is produced in the liquid crystal display panel 18 and the protective part 13. Consequently, since the liquid crystal display panel 18 is not deformed, a high-luminance and high-contrast image display which is free from image defects can be provided.

Moreover, due to the cured resin layer 25 obtained by curing this curable resin composition 21, an image display apparatus 1C which is strong against shocks and thinner than the conventional example, in which a gap is provided between the image display part and the protective part, can be provided.

In the above-described embodiment, a given amount of a photocurable and thermosetting curable resin composition 21 is dropped onto a region on the inner side of the spacer 19 on the base 12. However, as illustrated in FIG. 6(a), the given amount may be dropped on a face on the shielding part 15 side of the protective part 13, and then the protective part 13 may be inverted to bond the protective part 13 and the base 12.

Figure 6:
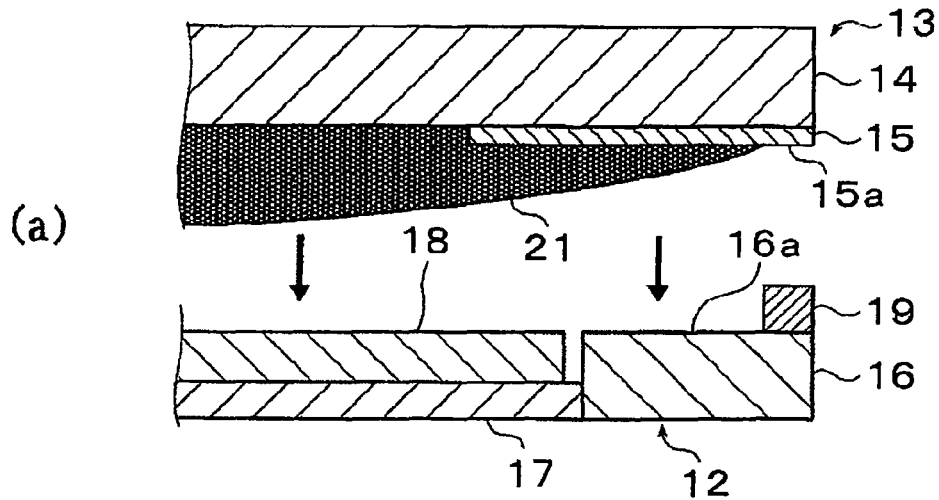
FIG. 6 shows cross-sectional process diagrams illustrating the main parts of a modified form of the same embodiment.
Figure 6:
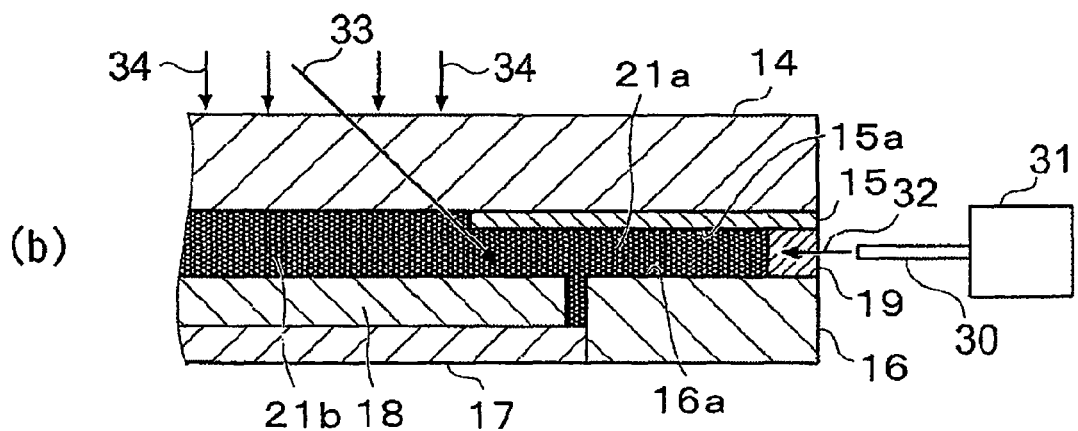
Figure 6:
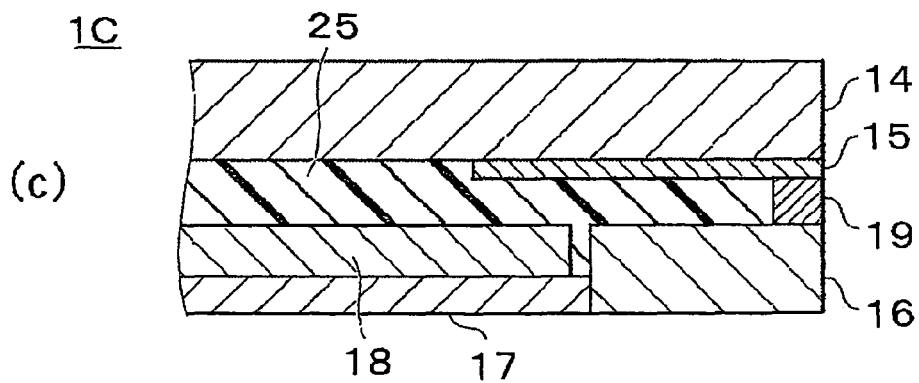

In such a case, as illustrated in FIGS. 6(b) and 6(c), the photocuring and thermal curing of the curable resin composition 21 may be carried out in the same manner as described in the above embodiment.

Figure 7:
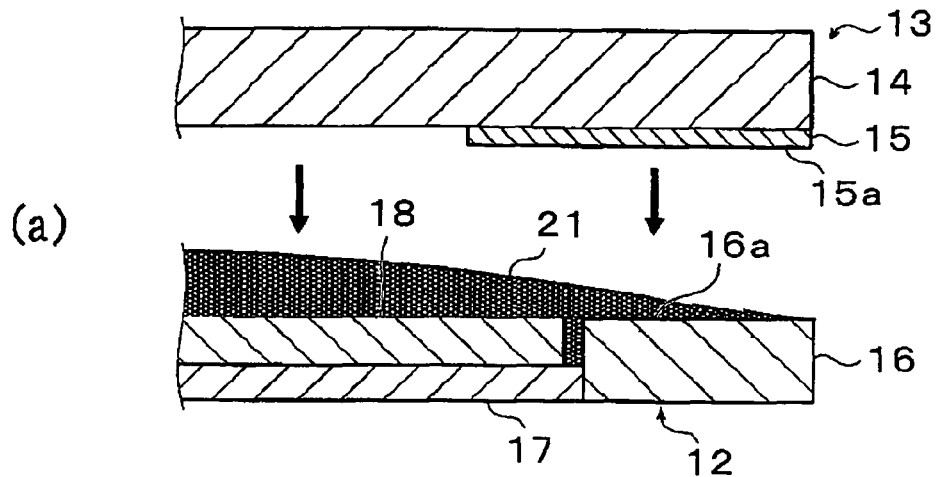
FIG. 7 shows cross-sectional process diagrams illustrating the main parts of another embodiment.
Figure 7:
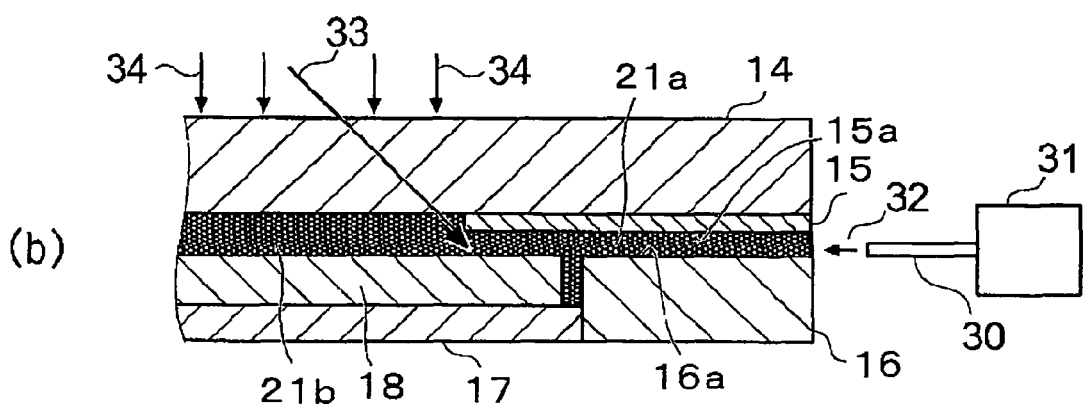
Figure 7:
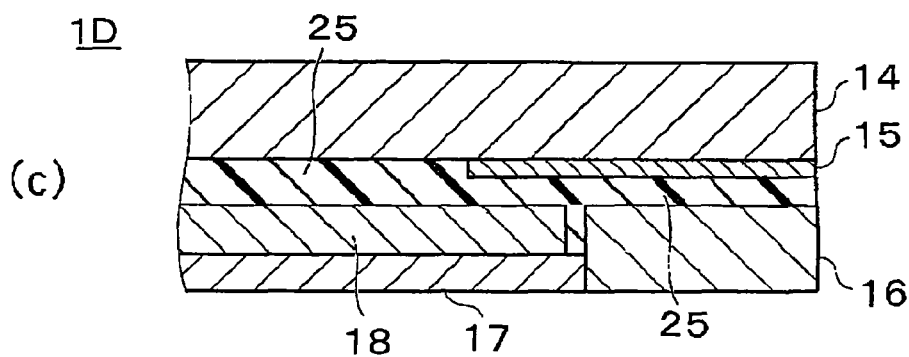

Furthermore, as illustrated in FIG. 7, an image display apparatus 1D may also be produced without the spacer 19. In this case, the curable resin composition 21 is coated on the base 12, the protective part 13 is then placed over the coated resin composition, and the photocuring and thermal curing are carried out in the same manner as described above.

Figure 8:
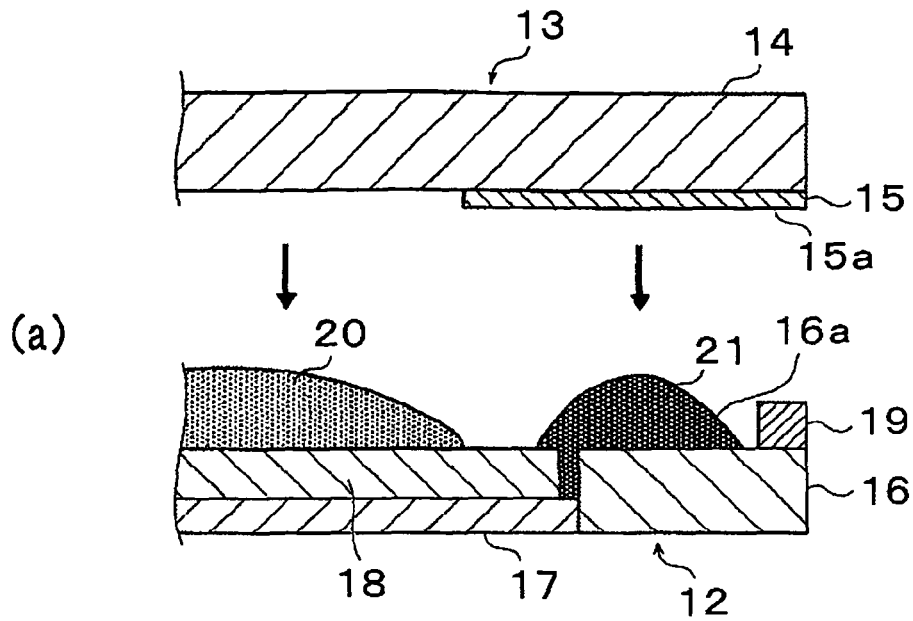
FIG. 8 shows cross-sectional process diagrams illustrating the main parts of yet another embodiment.
Figure 8:
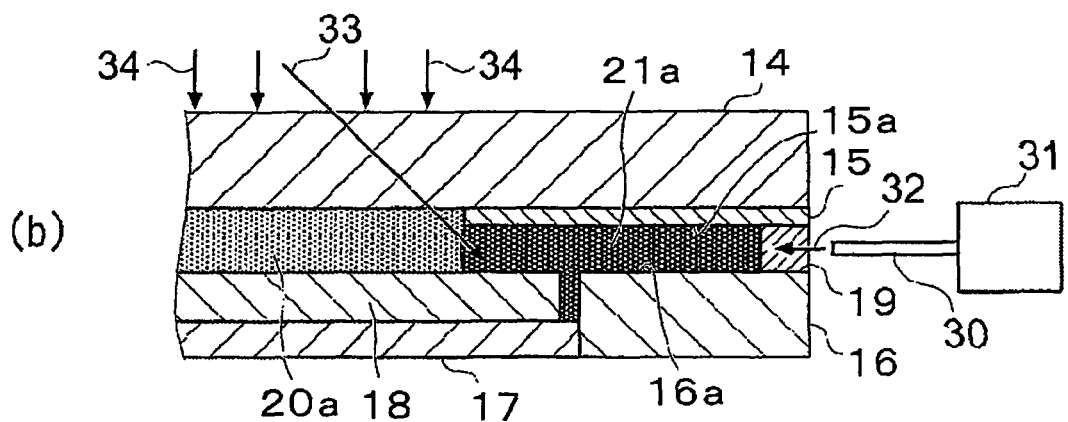
Figure 8:
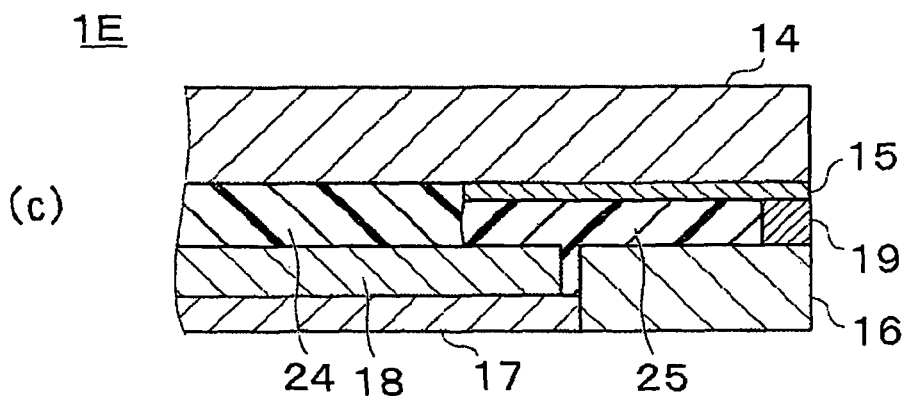

FIGS. 8(a) to 8(c) are cross-sectional process diagrams illustrating the main parts of yet a further different embodiment. Below, parts corresponding to the above-described embodiment are denoted with the same reference numerals, and thus a detailed description thereof will be omitted here.

As illustrated in FIG. 8(a), the above-described base 12 and protective part 13 are also used in the present embodiment.

In the present embodiment, first, a given amount of the photocurable resin composition 20 of the present invention is dropped onto the liquid crystal display panel 18 of the base 12. The same composition as the above-described photocurable and thermosetting curable resin composition 21 is used for this photocurable resin composition 20, except that a thermal polymerization initiator is not added.

Furthermore, as illustrated in FIG. 8(a), a given amount of the above-described photocurable and thermosetting curable resin composition 21 is dropped onto a region facing the shielding part 15 of the protective part 13 in a region on the inner side of the spacer 19 on the base 12 (in the present embodiment, a region extending across both the frame 16 and the liquid crystal display panel 18).

Then, as illustrated in FIG. 8(a), the protective part 13 is arranged on the spacer 19 of the base 12, and a photocurable resin composition 20a, whose rear surface is in an image display region, is arranged in contact with the curable resin composition 21a which is in a region where a shielding part is formed.

Subsequently, as illustrated in FIG. 8(b), UV-rays 34 are irradiated through the light-transmitting member 14 on the photocurable resin composition 20a of the image display region.

Optionally, as illustrated in FIG. 8(b), simultaneously with the irradiation of the UV-rays 34, UV-rays 32 may also be directly irradiated from the outward side face of the bonding face 15a of the shielding part 15, namely, through a gap between the frame 16 and the shielding part 15 among the spacers 19, on the curable resin composition 21a between the shielding part 15 and the base 12 using the UV irradiation apparatus 31.

Using a not-illustrated UV irradiation apparatus, UV-rays 33 may also be irradiated through the light-transmitting member 14 from the inward side face of the bonding face 15a of the shielding part 15 on the curable resin composition 21a between the shielding part 15 and the base 12.

By the irradiation of the UV-rays 32 and 33, the resin can be cured rapidly and reliably.

Furthermore, in the present embodiment too, at least the curable resin composition 21a between the shielding part 15 and the base 12 is heated.

By thus irradiating with UV-rays 34, heating the resin, and optionally irradiating with UV-rays 32 and 33, as illustrated in FIG. 8(c), the photocurable resin composition 20a in the image display region and the curable resin composition 21a in the region where a shielding part is formed can be cured to form the cured resin layers 24 and 25 and obtain the intended image display apparatus 1E.

According to the present embodiment, in addition to the advantages described in the above embodiments, because the curing is carried out by arranging the curable resin composition 21 containing a thermal polymerization initiator only between the frame 16 of the base 12 and the shielding part 15, the used amount of the thermal polymerization initiator can be reduced. Furthermore, compared with when thermally curing by including the thermal polymerization initiator in the whole curable resin composition which is arranged between the protective part 13 and the base 12, the heating time can be made relatively shorter and the heating temperature lower. Therefore, there are the merits that the effects on the plastic material constituting the image display apparatus are small. Furthermore, the advantages of the above-described embodiments can also be obtained.

Figure 9:
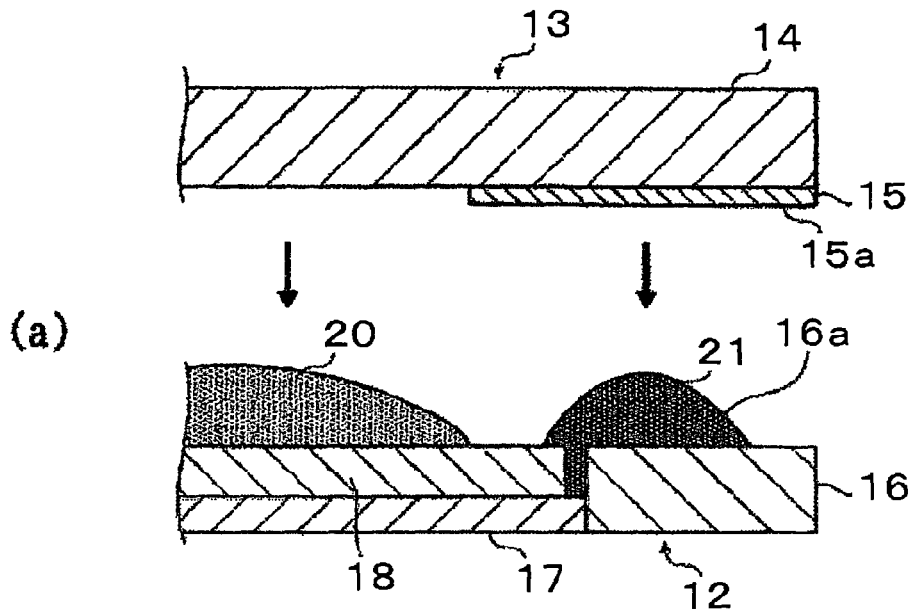
FIG. 9 shows cross-sectional process diagrams illustrating the main parts of yet another embodiment.
Figure 9:
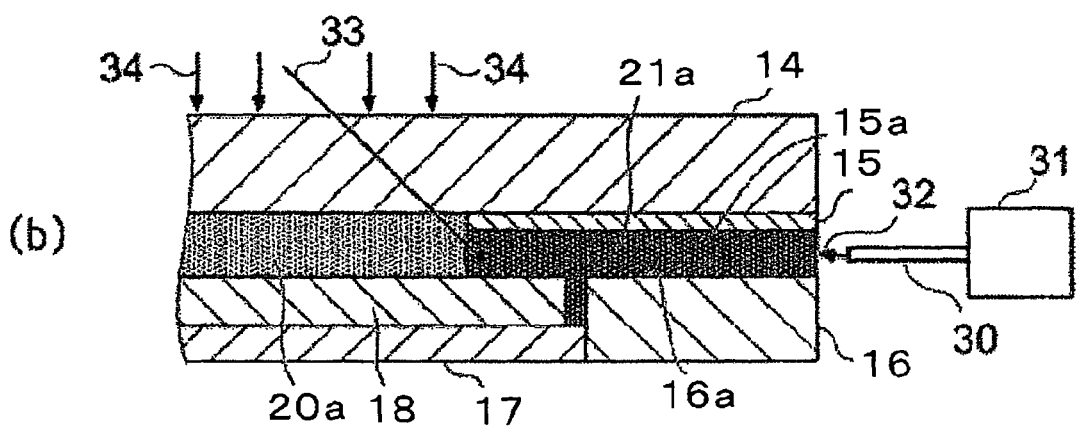
Figure 9:
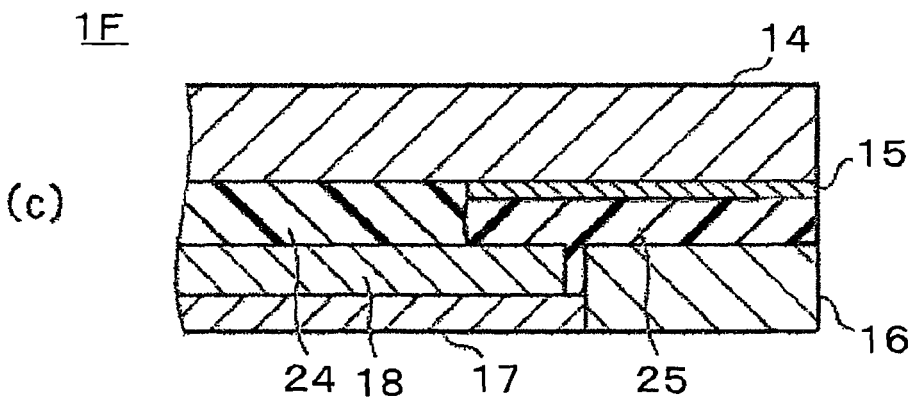

As illustrated in FIG. 9, in the present embodiment too, an image display apparatus 1F may be produced without the spacer 19.

The present invention is not limited to the above-described embodiments, and various changes may be carried out. For example, the irradiation of the UV-rays on the curable resin composition in the image display region and the irradiation of the UV-rays on the curable resin composition in the region where a shielding part is formed may be carried out simultaneously, or in separate steps.

When arranging the curable resin composition 21a in the region where a shielding part is formed, a gap may be partially provided on a side portion between the frame 16 and the bonding faces 15a and 16a of the shielding part 15. By doing so, when irradiating the UV-rays 32 from the outward side face of the face forming the shielding part, light can be made to reliably reach the resin composition, enabling the resin composition to be thoroughly cured.

Although the present invention may be preferably applied in the above-described liquid crystal display apparatus, the present invention is not limited thereto. For example, the present invention can also be applied in various panel displays, such as an organic EL device, a plasma display apparatus and the like.

EXAMPLES

The present invention will now be described in more detail using the following examples and comparative examples. However, the present invention is not limited to these examples and comparative examples.

Example 1

The resin composition of Example 1 was prepared by kneading in a kneader 50 parts by weight of polyurethane acrylate, 30 parts by weight of isobornyl acrylate, 3 parts by weight of a photopolymerization initiator, and 1 part by weight of a visible-region photopolymerization initiator.

Example 2

The resin composition of Example 2 was prepared by kneading in a kneader 70 parts by weight of an ester formed from a maleic anhydride adduct of a polyisoprene polymer and 2-hydroxyethyl methacrylate, 30 parts by weight of dicyclopentenyloxyethyl methacrylate, 10 parts by weight of 2-hydroxybutyl methacrylate, 30 parts by weight of a hydrogenated terpene resin, 140 parts by weight of a butadiene polymer, 4 parts by weight of a photopolymerization initiator, and 0.5 parts by weight of a visible region photopolymerization initiator.

Example 3

The resin composition of Example 3 was prepared by kneading in a kneader 100 parts by weight of an ester formed from a maleic anhydride adduct of a polyisoprene polymer and 2-hydroxyethyl methacrylate, 30 parts by weight of dicyclopentenyloxyethyl methacrylate, 10 parts by weight of 2-hydroxybutyl methacrylate, 30 parts by weight of a hydrogenated terpene resin, 210 parts by weight of a butadiene polymer, 7 parts by weight of a photopolymerization initiator, and 1.5 parts by weight of a visible region photopolymerization initiator.

Example 4

The resin composition of Example 4 was prepared by kneading in a kneader 70 parts by weight of an ester compound formed from a maleic anhydride adduct of a polyisoprene polymer and 2-hydroxyethyl methacrylate (trade name: UC-203, Kuraray Co., Ltd.), 30 parts by weight of dicyclopentenyl oxyethyl methacrylate (trade name: FA512M, Hitachi Chemical Co., Ltd.), 10 parts by weight of 2-hydroxybutyl methacrylate (trade name: Light Ester HOB, Kyoeisha Chemical Co., Ltd.), 30 parts by weight of a hydrogenated terpene resin (trade name: Clearon P-85, Yasuhara Chemical Co., Ltd.), 35 parts by weight of a butadiene polymer (trade name: Polyoil 110, Zeon Corporation), 5 parts by weight of a photopolymerization initiator (trade name Irgacure 184D, Ciba Specialty Chemicals Inc.), and 2 parts by weight of a photopolymerization initiator (trade name SpeedCure TPO, Nihon SiberHegner KK).

Example 5

The resin composition of Example 5 was prepared by kneading in a kneader 50 parts by weight of polyurethane acrylate (trade name: UV-3000B, manufactured by Nippon Synthetic Chemical Industry Co., Ltd.), 30 parts by weight of isobornyl acrylate (trade name: IBXA, manufactured by Osaka Organic Chemical Industry Ltd.), 5 parts by weight of an organic peroxide compound (trade name: Perbutyl O, manufactured by NOF Corporation), 3 parts by weight of a photopolymerization initiator (trade name: Irgacure 184, manufactured by Ciba Specialty Chemicals Inc.), and 1 part by weight of a photopolymerization initiator (trade name: SpeedCure TPO, manufactured by Nihon SiberHegner KK).

Comparative Example 1

The resin composition of Comparative Example 1 was prepared by kneading in a kneader 50 parts by weight of polybutadiene acrylate, 20 parts by weight of hydroxyethyl methacrylate, 3 parts by weight of a photopolymerization initiator, and 1 part by weight of a visible-region photopolymerization initiator.

Comparative Example 2

The resin composition of Comparative Example 3 was prepared by kneading in a kneader 50 parts by weight of polyurethane acrylate, 30 parts by weight of tricyclodecane dimethanol acrylate, 3 parts by weight of a photopolymerization initiator, and 1 part by weight of a visible-region photopolymerization initiator.

Comparative Example 3

The resin composition of Comparative Example 3 was prepared by kneading in a kneader 50 parts by weight of polybutadiene acrylate, 20 parts by weight of isobornyl acrylate, 3 parts by weight of a photopolymerization initiator, and 1 part by weight of a visible-region photopolymerization initiator.

Evaluation 1

Each of the resin compositions prepared in Examples 1 to 5 and Comparative Examples 1 to 3 was dropped onto a 100 μm-thick white glass plate to a predetermined thickness. The plates were transported on a UV-conveyor to obtain cured resins having a predetermined thickness. The cured resins were used as samples.

The light transmittance, storage modulus, curing shrinkage ratio, and surface roughness of each sample were determined as described below.

[Light Transmittance]

Using a UV-Visible Spectrophotometer (V-560, JASCO Corporation), each sample (cured resin thickness of 100 μm) was analyzed for the transmittance in the visible range. All of the samples had a 90% or higher transmittance.

[Storage Modulus]

Using a viscoelastometer (DMS6100, Seiko Instruments Inc.), the storage modulus (Pa) (25° C.) of each sample was measured at a frequency of 1 Hz. The obtained results are shown in Table 1.

[Curing Shrinkage Ratio]

The curing shrinkage ratio (%) of each sample was determined by the following equation using the difference in the specific gravities between the uncured resin solution and the cured solid product, as measured by an electronic densimeter (SD-120L, Mirage). The obtained results are shown in Table 1.

Curing shrinkage ratio (%)=(Cured product specific gravity−Resin solution specific gravity)/Cured product specific gravity×100    [Equation 1]

[Surface Roughness Measurement]

2 mg of each resin composition was dropped onto a glass plate for a liquid crystal cell. The distortion (Ra: average surface roughness) in a given region (2.93 mm×2.20 mm) of a glass plate surface formed by the internal stress generated during UV-curing was measured using a three-dimensional non-contact surface roughness meter manufactured by Zygo Corporation. The obtained results are shown in Table 1.

TABLE 1

Properties and Evaluation Results of the Examples and Comparative Examples

| | Storage Modulus (Pa) | Curing Shrinkage Ratio (%) | Ra: Average Surface Roughness (nm) |
|---|---|---|---|
| Example 1 | $1 \times 10^6$ | 4.5 | 5.5 |
| Example 2 | $1 \times 10^4$ | 1.8 | 2.7 |
| Example 3 | $4 \times 10^3$ | 1.0 | 1.5 |
| Example 4 | $4 \times 10^5$ | 3.8 | 5.0 |
| Example 5 | $1 \times 10^6$ | 4.5 | 5.5 |
| Comparative Example 1 | $2 \times 10^7$ | 5.6 | 12.4 |
| Comparative Example 2 | $3 \times 10^8$ | 4.3 | 36.5 |
| Comparative Example 3 | $5 \times 10^8$ | 5.6 | 64.2 |

As can be seen from Table 1, Example Resins 1 to 5 had a storage modulus of $4 \times 10^3$ to $1 \times 10^6$ Pa and a curing shrinkage ratio of 1.0 to 4.5%. Consequently, the average surface roughness Ra was from 1.5 to 5.5 nm, and there was hardly any distortion, meaning that good results were obtained.

In comparison, Ra was significantly large in Comparative Example 1 (Ra=12.4 nm), Comparative Example (Ra=36.5 nm), and Comparative Example 3 (Ra=64.2 nm), from which it can be understood that the distortion at the interface between the resin and the glass plate was caused by the internal stress generated during curing of the resin.

Evaluation 2 [Impact resistance]

The resin composition of Example 1 was cured between a 50 mm×50 mm×0.5 mm glass plate (display part) and a 50 mm×50 mm×0.5 mm polycarbonate plate (protective part) to form a 0.1 mm-thick layer between the two plates. The resulting panel served as an Example sample panel. In this case, a spacer was not used, and the sample panel had a total thickness of 1.1 mm. To produce the sample panel, the resin composition of Example 1 was coated on the glass plate and the polycarbonate plate was placed over the coated resin composition. The resin composition was then cured by UV irradiation from the polycarbonate plate side.

Figure 10:
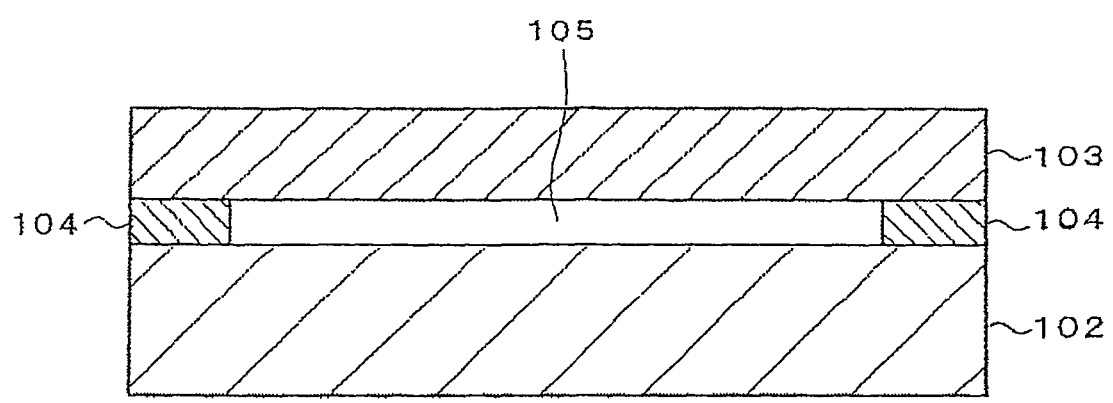
FIG. 10 is a cross-sectional diagram illustrating the main parts of a display apparatus according to the conventional art.

Meanwhile, a sample panel according to the conventional technique illustrated in FIG. 10 was produced. The same parts as used to make the Example sample panel were used for the liquid crystal display panel (display part) 102 and the protective part 103. A 1.0 mm-thick spacer was arranged between the display part and the protective part to produce a panel with a 1.0 mm air gap and a total thickness of 2.0 mm. This panel served as the Comparative Example sample panel.

The Example sample panel and the Comparative Example sample panel were fixed along their periphery using a given jig. A panel breakage test was then performed by pressing a pressing member, 5 mm in diameter, perpendicularly against the surface of the protective part at a press speed of 1 mm/sec.

The Comparative Example sample panel with the air gap formed between the display part and the protective part broke at 1 N/cm², whereas the Example sample panel broke at 1.43 N/cm².

The results demonstrate that the Example panel can be a panel which has a 43% better press strength, and yet is thinner than the Comparative Example panel.

Evaluation 3-1 (Cure Ratio of the Resin Composition)

0.2 g of each of the resin composition of Example 1 and the resin composition of Example 5 was dropped in a region on the inner side of the spacer onto a liquid crystal display substrate like that illustrated in FIG. 4(a). As the protective part, a 2.0 mm wide acrylic plate having a shielding part was placed on the spacer. Next, the respective resin compositions were photocured under the following curing conditions A to D to produce liquid crystal display apparatuses, as shown in Table 2.

The acrylic plates were peeled off the obtained liquid crystal display apparatuses, and the cure ratio of the cured product of each of the respective resin compositions of Examples 1 and 5 was measured as described below. The results are shown in Table 2.

Curing Conditions A:

The liquid crystal display apparatus was produced by irradiating a cumulative amount of UV rays of 5,000 mJ using a UV lamp (manufactured by Ushio Inc.) from a location about 10 cm away from the acrylic plate to photocure the resin composition.

Curing Conditions B:

In addition to the irradiation conditions of Curing Conditions A, heating was carried out at 80° C. for 60 minutes by placing a heater on the periphery of the frame.

Curing Conditions C:

In addition to the irradiation conditions of Curing Conditions A, a cumulative amount of UV rays of 5,000 mJ was irradiated using an optical fiber along the whole periphery of the frame on which the shielding part of the liquid crystal display apparatus was formed from about 3 cm away.

Curing Conditions D:

In addition to the irradiation conditions of Curing Conditions A, heating was carried out at 80° C. for 60 minutes by placing the liquid crystal display apparatus on a heating stage, and also by irradiating a cumulative amount of UV rays of 5,000 mJ using an optical fiber along the whole periphery of the frame on which the shielding part of the liquid crystal display apparatus was formed from about 3 cm away.

Cure Ratio Measurement Method:

From each of the pre-curing resin compositions and the cured products, the curing component (monomers, oligomers) was extracted using acetonitrile in an amount so that the resin compositions and cured products were 0.2 wt %. The peak intensity $I_0$ of the curing component in the resin compositions and the peak intensity $I_1$ of the curing component in the cured products were determined by liquid chromatography, and the cure ratio was calculated by the following equation.

$$\text{Cure ratio (\%)} = (I_0 - I_1)/I_0 \times 100 \quad \text{[Equation 2]}$$

Evaluation 3-2

Using the resin compositions of Examples 1 and 5, liquid crystal display apparatuses were produced in the same manner as in Evaluation 3-1, except for using as the protective part a 5.0 mm wide acrylic plate having a shielding part. However, the curing conditions were changed. Then, in the same manner as in Evaluation 3-1, the cure ratio of the cured resin in the obtained liquid crystal display apparatuses was measured. The results are shown in Table 3.

TABLE 2

(Shielding Part 2 mm)

| Liquid Crystal Display Apparatus (Resin Composition) | Curing Conditions | Resin Composition Cure Ratio | |
|---|---|---|---|
| | | Center Portion of Display Part | Directly Under Shielding Part (2 mm) |
| Example 1 Resin Composition | A | 95% | 50% |
| | C | 95% | 95% |
| Example 5 Resin Composition | A | 95% | 50% |
| | B | 95% | 95% |
| | C | 95% | 95% |
| | D | 95% | 95% |

Curing Conditions A: UV irradiation only from acrylic plate side
Curing Conditions B: UV irradiation from acrylic plate side and heating by a heater
Curing Conditions C: UV irradiation from acrylic plate side and heating from the side of the apparatus side
Curing Conditions D: UV irradiation from acrylic plate side, heating by a heater, and heating from the side of the apparatus side

TABLE 3

(Shielding Part 5 mm)

| Liquid Crystal Display Apparatus (Resin Composition) | Curing Conditions | Resin Composition Cure Ratio | |
|---|---|---|---|
| | | Center Portion of Display Part | Directly Under Shielding Part (5 mm) |
| Example 1 Resin Composition | A | 95% | 50% |
| | C | 95% | 70% |
| Example 5 Resin Composition | A | 95% | 50% |
| | B | 95% | 95% |
| | C | 95% | 75% |
| | D | 95% | 95% |

Curing Conditions A to D: Same as the curing conditions in Table 2

From Tables 2 and 3, it is clear that when only UV irradiation was carried out from the acrylic plate side (Curing Conditions A), both the resin composition of Example 5, which contains both a photopolymerization initiator and a thermal polymerization initiator, and the resin composition of Example 1, which contains a photopolymerization initiator but does not contain a thermal polymerization initiator, had a cure ratio that was good for the center portion of the image display part. However, regardless of the width of the shielding part, curing was not sufficient directly under the shielding part.

When the UV irradiation was carried out from the acrylic plate side and from the side face thereof (Curing Conditions C), when the shielding part had a narrow width (2 mm), a good cure ratio was exhibited at both the center portion of the image display part and directly under the shielding part. However, when the shielding part was wider (5 mm), the cure ratio directly under the shielding part was decreased (75%: see Curing Conditions C of the resin composition of Example 1 in Table 3).

On the other hand, using the resin composition of Example 5, when UV irradiation and heating were both carried out (Curing Conditions B and D), regardless of the width of the shielding part, the resin composition cure ratio improved to 95% for both the center portion of the image display part and directly under the shielding part. Thus, very good results were obtained.

INDUSTRIAL APPLICABILITY

The present invention is useful in an image display apparatus such as a liquid crystal display apparatus and the like.

The invention claimed is:

1. A method for producing an image display apparatus comprising the steps of:
   allowing a photocurable resin composition to be arranged between a base having an image display part and a light-transmitting protective part having a shielding part;
   forming a cured resin layer by photocuring the curable resin composition, wherein, as the photocurable resin composition, a resin composition is used for forming a cured resin layer that is arranged between an image display part of an image display apparatus and a light-transmitting protective part, the resin composition having a curing shrinkage ratio of 5.0% or less, a 100 μm-thick cured resin formed by curing the resin composition having a transmittance in the visible region of 90% or higher and the resin composition having a storage modulus at 25° C. of $1 \times 10^7$ Pa or less;
   allowing a curable resin composition containing a thermal polymerization initiator to be arranged at least between the shielding part and the base; and
   heating the curable resin composition.

2. The production method according to claim 1, wherein the curable resin composition containing the thermal polymerization initiator to be arranged between the shielding part and the base is a photocurable resin composition.

3. The production method according to claim 2, wherein a photocurable resin composition to be arranged between a non-shielding part of the protective part and the base does not contain a thermal polymerization initiator, and the photocurable resin composition containing the thermal polymerization initiator to be arranged between the shielding part and the base is subjected to light irradiation and heating.

4. The production method according to claim 1, wherein the curable resin composition to be arranged between the shielding part and the base has a curing shrinkage ratio of 5.0% or less and a storage modulus at 25° C. of $1.0 \times 10^7$ Pa or less.

5. The production method according to claim 1, wherein the cured resin layer has a thickness of 50 to 200 μm.

6. The production method according to claim 3, wherein the light irradiation on the photocurable resin composition to be arranged between the shielding part and the base is carried out from an outward side face of a face forming the shielding part.

7. The production method according to claim 1, wherein the image display part is a liquid crystal display panel.

8. The production method according to claim 1, wherein the protective part is formed from an acrylic resin.

9. The production method according to claim 1, wherein the protective part is formed from an optical glass.

10. An image display apparatus produced by the production method according to claim 1.

11. A method for producing an image display apparatus comprising the steps of:

allowing a photocurable resin composition to be arranged between a base having an image display part and a light-transmitting protective part having a shielding part;

forming a cured resin layer by photocuring the curable resin composition, wherein as the photocurable resin composition, a resin composition is used for forming a cured resin layer that is arranged between an image display part of an image display apparatus and a light-transmitting protective part, the resin composition having a curing shrinkage ratio of 5.0% or less, a 100 μm-thick cured resin formed by curing the resin composition having a transmittance in the visible region of 90% or higher and the resin composition having a storage modulus at 25° C. of $1\times10^7$ Pa or less; and allowing a curable resin composition containing a thermal polymerization initiator to be arranged at least between the shielding part and the base, wherein the curable resin composition containing the thermal polymerization initiator to be arranged between the shielding part and the base is a photocurable resin composition.

12. An image display apparatus produced by the method according to claim 11.

13. A method for producing an image display apparatus comprising the steps of:

allowing a photocurable resin composition to be arranged between a base having an image display part and a light-transmitting protective part having a shielding part;

forming a cured resin layer by photocuring the curable resin composition, wherein as the photocurable resin composition, a resin composition is used for forming a cured resin layer that is arranged between an image display part of an image display apparatus and a light-transmitting protective part, the resin composition having a curing shrinkage ratio of 5.0% or less, a 100 μm-thick cured resin formed by curing the resin composition having a transmittance in the visible region of 90% or higher and the resin composition having a storage modulus at 25° C. of $1\times10^7$ Pa or less; and allowing a curable resin composition containing a thermal polymerization initiator to be arranged at least between the shielding part and the base, wherein the photocurable resin composition to be arranged between the shielding part and the base is subject to light irradiation that is carried out from an outward side face of a face forming the shielding part.

14. An image display apparatus produced by the method according to claim 13.

* * * * *

UNITED STATES PATENT AND TRADEMARK OFFICE
CERTIFICATE OF CORRECTION

PATENT NO. : 8,773,624 B2
APPLICATION NO. : 12/450108
DATED : July 8, 2014
INVENTOR(S) : Yoshihisa Shinya et al.

It is certified that error appears in the above-identified patent and that said Letters Patent is hereby corrected as shown below:

Title Page Item (73), please change "SONY CHEMICAL & INFORMATION DEVICE CORPORATION" to --DEXERIALS CORPORATION--.

Signed and Sealed this
Twenty-fourth Day of March, 2015

Michelle K. Lee
*Director of the United States Patent and Trademark Office*